May 19, 1936.  V. H. HARBERT  2,041,064
WEAR RECEIVING ELEMENT FOR BRAKE HEADS
Filed Feb. 15, 1935  3 Sheets-Sheet 1
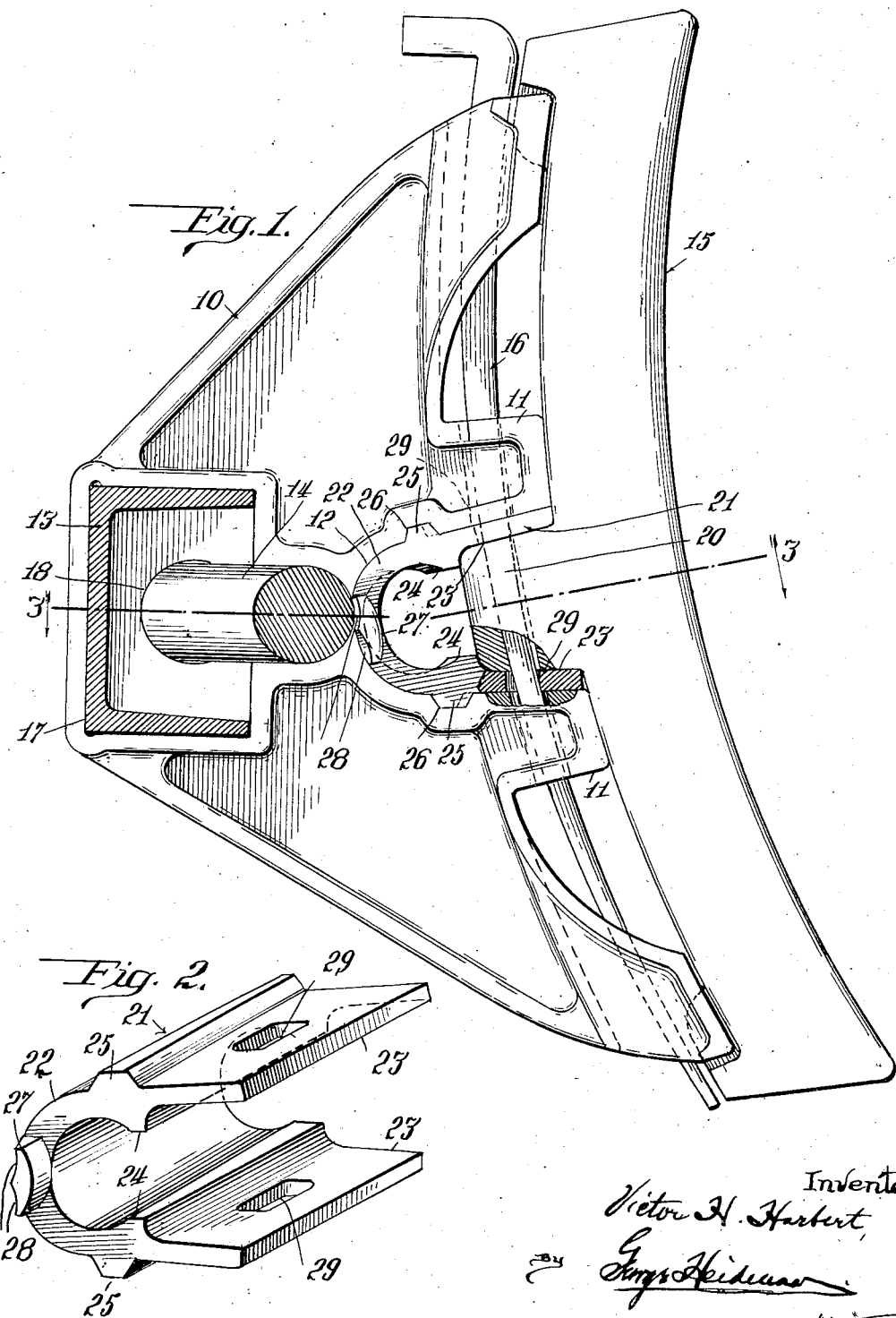

May 19, 1936.  V. H. HARBERT  2,041,064
WEAR RECEIVING ELEMENT FOR BRAKE HEADS
Filed Feb. 15, 1935  3 Sheets-Sheet 2
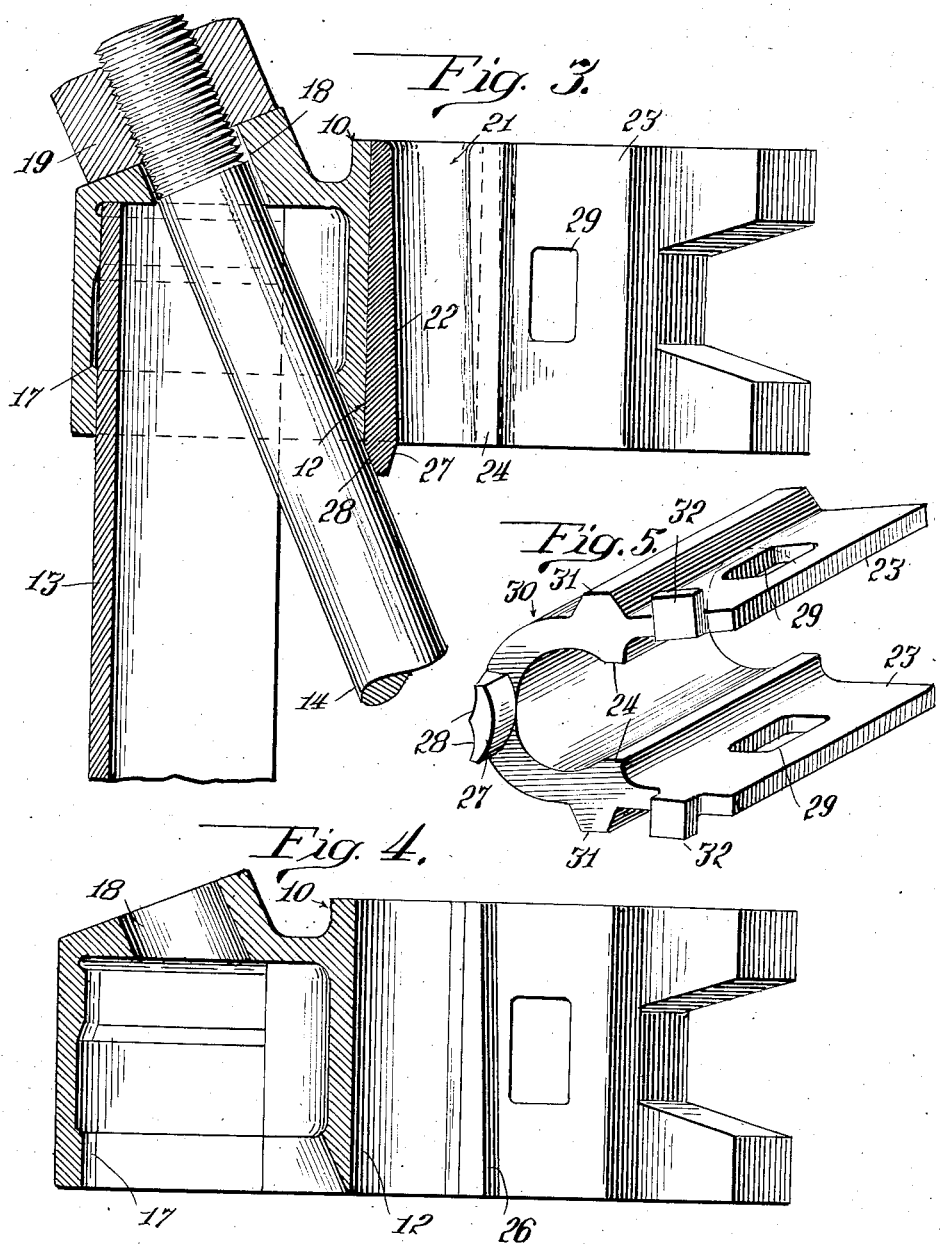

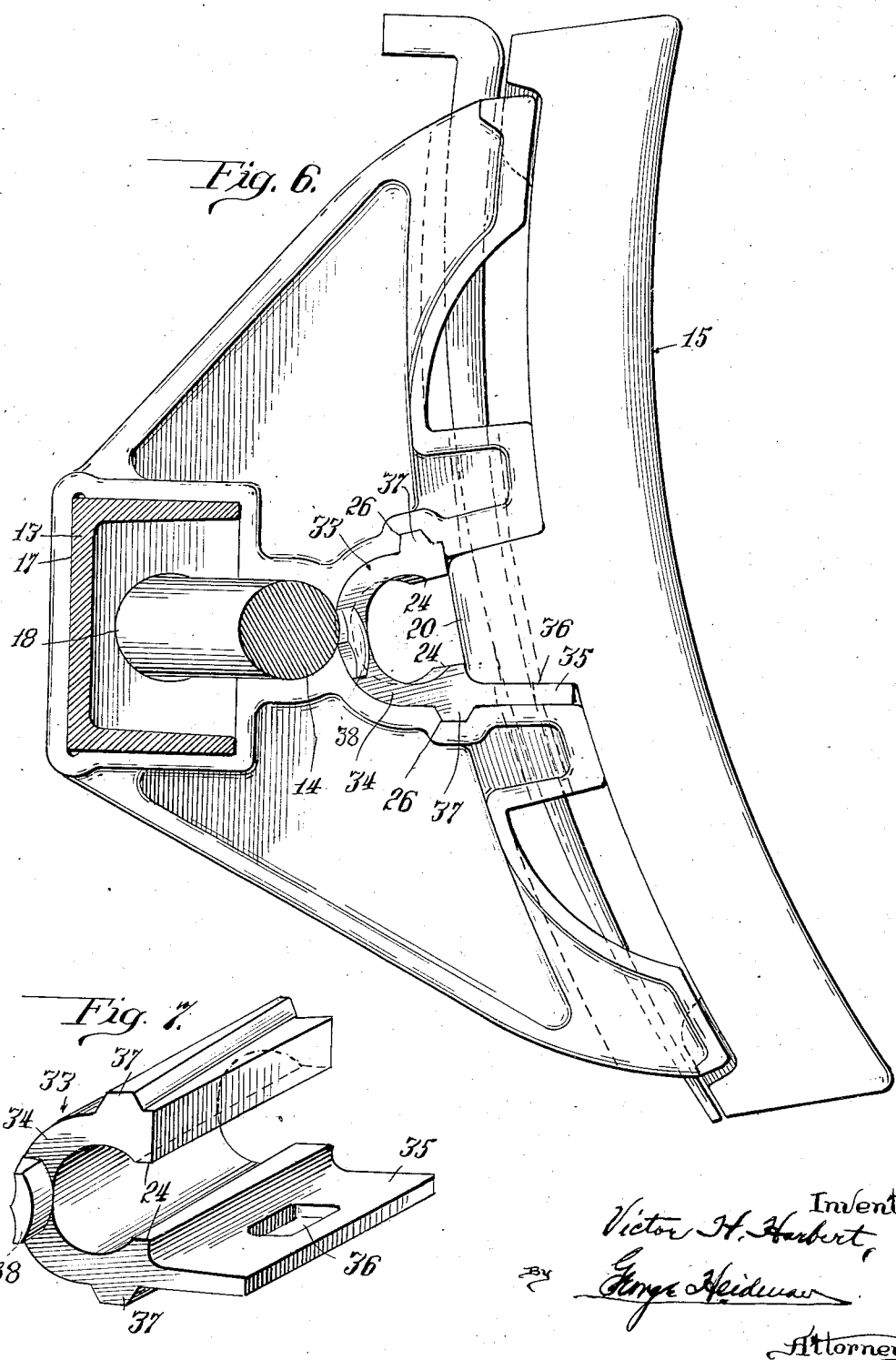

Patented May 19, 1936

2,041,064

UNITED STATES PATENT OFFICE 2,041,064

WEAR RECEIVING ELEMENT FOR BRAKE HEADS

Victor H. Harbert, Chicago, Ill., assignor to Illinois Railway Equipment Company, Chicago, Ill., a corporation of Illinois Application February 15, 1935, Serial No. 6,706

10 Claims. (Cl. 188—243)

My invention relates to means adapted to be readily applied to the standard center hung type of brake head so as to be disposed in the hanger receiving socket and intermediate of the usual lug on the rear of the brake shoe and the two vertically spaced lugs on the forward face of the brake head which are adapted to lap the lug of the shoe; the elements being thus adapted to take care of or absorb the wear which ordinarily would be encountered by the brake head lugs due to the more or less constant vibratory movement of the brake shoe.

My improved wear receiving elements also extend into or are arranged in the hanger socket of the head and are designed to take care of any wear that may be encountered by the brake head at the perimeter of the hanger receiving socket due to the frictional relation existing between the brake head and the usual supporting hanger.

The invention also has for its object the provision of a wear receiving element wherein the relation between the shoe locking key openings in said element and the openings in the key receiving lugs of the structure is such that frictional contact between the key and said lugs will be prevented, while the element is adapted to be in frictional contact with the key to prevent accidental movement of the latter.

Another object of my invention is to provide an element which is adapted to be endwisely inserted into the hanger and brake shoe lug receiving socket of the brake head and to effect a wedging or holding relation against complete passage through said socket; with one end of said element arranged to effect holding relation with the truss member of the brake beam to prevent movement of said element transversely of the brake head.

The above enumerated objects of my invention, as well as others inherent in the construction, will all be readily comprehended from the detailed description of the accompanying drawings, wherein—

Figure 1 is a side elevation of a brake head and shoe with one form of my improved element applied thereto and with a portion of the brake beam and truss rod broken away and shown in section and a portion of the head and element shown in section.

Figure 2 is a perspective view of my improved wear receiving element shown in Figure 1.

Figure 3 is a sectional view taken substantially on the line 3—3 of Figure 1 and looking down.

Figure 4 is a cross sectional view of the brake head before application to the brake beam and before application of my improved wear receiving element.

Figure 5 is a perspective view of a modification of the wear receiving element.

Figure 6 is a side elevation of a brake head and shoe showing another form of my improved wear receiving element.

Figure 7 is a perspective view of the element shown in Figure 6.

My improved wear receiving element is shown in Figure 1 applied to the type of brake heads at present in use and of the center hung type, wherein the head 10 is provided with a pair of forwardly disposed lugs 11 vertically spaced apart to provide a socket 12 therebetween. The socket 15 at its inner end is substantially semi-cylindrical and adapted to receive the usual link hanger (not shown) whereby the assembled brake mechanism is pivotally supported in place; the mechanism involving the brake head 10, the brake beam, of which only a portion is shown and in section at 13; the truss rod or member 14; brake shoe 15 which in turn is locked to the brake head 10 by means of the usual locking key 16; a brake head with its attached shoe being secured to each end of the brake beam 13. The brake heads 10 are usually provided on one side with a brake beam receiving pocket or socket as shown at 17 in Figures 1, 3 and 4 and the head, coincident with the brake beam receiving socket, is also provided with an opening 18 therethrough to receive one end of the truss member or rod 14 whose outer end is generally threaded to receive the nut as shown at 19 whereby the brake head is clamped to the end of the brake beam 13 as more clearly shown in Figure 3.

The forward end of the socket 12 in the brake head, namely the outer end of the socket intermediate of the vertically spaced apart head lugs 11, 11 is intended to receive the usual shoe lug 20 therebetween; the head lugs 11, 11 and the shoe lug 20 being provided with the usual vertically disposed openings therethrough for receiving the locking key 6 which is insertible from the top of the assembly. The opposing faces of the head lugs and the top and bottom sides of the shoe lug are generally made sloping as shown in Figure 1; that is to say these lugs usually taper toward their outer ends.

The brake head 10 is of cast metal construction and the hanger receiving sockets and spacings between the lugs are made with more or less tolerance in order that easy application and free movement of the hanger may be had and so that the interengaging or lapping relation of the shoe lug with the head lugs may be readily obtained.

As a result, the hanger receiving socket of the brake head—(the latter being of softer material than the hangers)—readily becomes worn by the constant swinging movement between the head and hanger and thus permits the head to move out of efficient brake applying position.

Then, too, the fact that the shoe is made of harder metal than that of the head which, in addition to its weight, soon causes excessive wear of the head lugs and especially the upper face of the lower lug 11 of the head by the constant vibration of the shoe during car operation.

Hence the utility of the head is destroyed, necessitating replacement of the entire head or the formation of a new lug and welding the same in place. In either event it requires the car to be taken out of service.

These difficulties are entirely eliminated by my improved wear receiving element 21 shown in detail in Figure 2. The element 21 preferably is composed of a single metal piece of dimensions corresponding with the width of the socketed portion 12 of the brake head 10 and given substantially U-shape, in cross section, with its rear longitudinal side 22 of arcuate formation to fit the hanger receiving socket 12 in the head. The top and bottom walls 23, 23 flare apart slightly toward the forward open longitudinal side of the element so as to correspond with the sloping faces of the head lugs 11, 11 as well as the tapered faces of the shoe lug 20.

The walls of element 21 at the juncture between the arcuate portion 22 and the top and bottom sides 23 on the interior is somewhat enlarged at 24 so as to slightly restrict the throat or entrance of the hanger receiving portion of the socket to a dimension less than the usual major axis of the lower end of the hanger and thus prevent movement of the hanger out of its operative position in the socket after the members of the brake mechanism have been assembled.

The top and bottom outer faces of the element are each shown provided with a rib 25 which preferably extends throughout the length of the element as shown in Figure 2; and these ribs are shown with the opposite outwardly sloping sides, and the ribs taper from one end toward the other.

The socketed portion of the head is provided with transversely disposed grooves at 26, 26, which taper from one side of the head toward the opposite side; the grooves 26, 26 being adapted to receive the tapered ribs 25 and effect wedging relation. As is apparent, the tapered grooves and ribs merely permit the element to be inserted from one side of the head, namely through the end of the socket provided with the widest ends of the grooves 26 and passage of the element beyond or out of the opposite end of the socket prevented.

These ribs and grooves not only limit movement of the element in a direction transversely of the head but they also hold the element against movement toward the forward side of the head before the shoe is put in place.

The end of the element, at which the wide ends of the ribs 25 are located on the arcuate wall portion 22, is provided with a longitudinally disposed lug 27.

One side of the lug 27 is shown tapered or provided with dished surface on opposite sides of its median line as shown at 28, in Figure 2, so as not to interfere with the insertion of the truss rod 14 into proper position; the lug or lip 27 being adapted to contact or extend adjacent of the truss rod 14 and thus prevent outward movement of the wear element 21.

The top and bottom wall portions or wings 23, 23 are each provided with a similar opening or slot 29, aligned with each other and intended for passage of the shoe locking key 16 therethrough.

The openings 29 in the wear element 21 are preferably made of slightly less dimensions than the dimensions of the openings in the head lugs 10 so as to keep the locking key 16 out of rubbing contact with the softer metal of the head lugs. At the same time the wear element openings are such that a more or less frictional contact will be made with the shoe locking key 16 and thereby frictionally holding the key against any accidental longitudinal movement.

My improved wear resisting element 21 is driven endwisely into the socket of the head from the side provided with the wider ends of slots or gooves 26, namely the side which is provided with the brake beam receiving socket 17 and which side therefore is to be disposed toward the truss rod 14.

With the tapered grooves 26 and the tapered ribs 25, the element will be more or less wedgingly held in place and movement toward the opposite or outer side of the brake head made impossible.

After the element has been inserted in the socket of the brake head, the latter is then applied to the end of the brake beam 13 and the end of the truss rod 14 inserted through the opening 18 in the brake head and the elements held together by proper screwing of nut 19 on the outer threaded end of the truss rod. With the side of the lip or lug 27 tapered or dished as heretofore described, proper passage and positioning of the truss rod is possible; while movement of the wear element 21 is impossible as is clearly evident from the showing in Figure 3.

My improved element is preferably made out of heat treated steel and therefore harder than the metal of the head; and as is apparent, all wear between the brake hanger or link and the brake head, as well as all wear between the shoe lug 20 and the head lugs 11 and particularly the lower lug 11, and also the wear between the head lug and the locking key 16 heretofore encountered, will be taken care of by my improved wear element 21. At the same time, the element 21 will provide a firm non-chattering relation between the shoe and the head and thus provide for better brake application.

My present invention obviates the need of providing the element with bendable portions or tongues whereby to hold the element in place and hence there are no portions to flex out of holding position; the wear element being firmly secured in place against any movement by the ribs 25; which also reenforce the element; as well as by the lip 27.

The improved element is designed to receive all the wear referred to and therefore eliminates the constant annoyance of worn heads and the material expense of renewals. My wear element, as is apparent, is interchangeable so as to enable either wing or side portion 23 to be placed on the lower head lug 11 where most wear is encountered.

In order to remove the element 21, the nut 19 must be removed from the end of the truss rod, thus permitting the head 10 to be taken off the end of the beam 13, which will permit the element 21 to be driven out of its socket.

In order to reverse the position of the elements, in view of ribs 25 and lip 27, it is necessary to take the element of the head at one end of the beam 13 and substitute it for the element in the head at the other end of the beam. In order to make the elements interchangeable or adaptable for use either at the right or at the left ends of the beam 13, I preferably show the rearwardly disposed face of the lug or lip 27 provided with the double arcuate portions 28 so as to accommodate the truss rod 14.

In Figure 5 I illustrate a modification of the element in so far as the means for holding the element against movement entirely through the brake head socket is concerned. That is to say, instead of providing the brake head with grooves tapering toward the outer side of the head and the element with tapered ribs for wedgingly holding the element, the element 30 is substantially like the element 21, except that the ribs 31, 31 are made of uniform or equal width throughout. The element 30, like element 21, on its interior is also provided with the restricting ribs or enlargements 24 whereby the throat to the hanger receiving portion of the element is of a dimension less than the major axis of the lower end of the hanger.

The inner end of the element 30 is also shown provided with a lip or lug 27 extending longitudinally and adapted to contact the truss rod 14 and prevent inward movement of the element 30.

In order to prevent the element moving too far or entirely through the hanger receiving slot in the brake head I show the element, at the same end as the lip or lug 27, provided with means for preventing movement toward the outer side of the brake head. This means comprises the lugs 32, preferably on the top and bottom sides or walls of the element; the lugs 32 extending from the perimeter substantially at right angles so as to lap the inner side of the brake head.

It is apparent that the element 30 must be endwisely driven into the socket in the brake head from what may be termed the inner side where the lip or lug 27 will be disposed toward the truss rod.

In practice, the upper face of the lower lug of the vertically spaced lugs 11, 11 on the brake head is the lug which not only carries the brake shoe but is the one which receives the wear.

If desired therefore, the wear receiving element need merely be made to take care of the wear produced by the brake hanger and the wear encountered by the lower or brake-shoe carrying lug 11 as shown in Figure 6. The brake head 10 is like the head shown in Figure 1 and mounted on one end of the beam member 13 and of the center hung type.

The element 33, employed in Figure 6, is of J-shape in cross section as shown in Figure 7, provided along one longitudinal side with the substantially semi-cylindrical hanger receiving portion 34, open at both ends and toward the forward side of the element, with the longitudinal opening of dimensions somewhat less than the dimensions of the hanger receiving socket in portion 34.

The element of Figures 6 and 7 at top terminates adjacent the shoe lug 20. That is to say, the top wing or side 23 of the element shown in Figure 2 is omitted; the element being provided with the lower or bottom wing or side 35 which may be similar to the lower wing or side 23 in Figure 2. This lower wing or side 35 is provided with a key receiving opening 36 which is preferably so formed that the usual shoe locking key will be held out of frictional contact with the brake head lug 11.

The element 33, like element 21, is shown provided with the ribs 37, 37, which taper toward one of the ends in order to effect wedging engagement in the tapered grooves 26, formed in the brake head as heretofore described. The end of the element which is to be disposed inwardly or toward the truss rod side of the brake beam is also provided with the outwardly extending lug or lip 38 formed similar to the lug 27 shown in Figure 2 and adapted to engage the truss rod after the parts of the brake beam have been assembled.

In many instances this abbreviated type will be found sufficient especially where the spacing between the head lugs is such that the play between the shoe lug and the head lugs will be substantially taken up by the single wing or side 35.

The invention has been expressed in different forms which are believed best adapted to the uses for which the elements are intended, but variations may be made without, however, departing from the spirit of my invention.

What I claim is:

1. A wear receiving element of the character described adapted to be removably inserted in the hanger socket of a brake head and to lap the opposing faces of the brake head lugs, said element being composed of a single piece, substantially U-shape in cross-section, with the curved base portion adapted to be disposed in the hanger socket while the top and bottom walls are adapted to extend forwardly against the opposing faces of the two vertically spaced lugs of the brake head, said top and bottom walls being provided with key passages therethrough, said element being endwisely insertible in said socket and adapted to effect wedging relation with the head so as to prevent forward movement of the element, the curved base portion at one end of the element being provided with a lip or lug adapted to cooperate with the truss-rod of the brake-head.

2. A wear receiving element adapted to be removably inserted in the hanger socket of a brake head and to lap the opposing faces of the brake head lugs, said element being composed of a single piece substantially U-shape cross section disposed horizontally to provide top and bottom walls, the outer faces of the top and bottom walls being provided with tapered ribs extending longitudinally of the element, said walls being also provided with key passages, while one end is provided with a longitudinally disposed lug.

3. In combination with a brake beam, a truss rod and the brake head, the brake head being provided with a center hanger socket and vertically spaced lugs, with the wall of the socket provided with a groove disposed transversely of the head, a wear receiving element having an arcuate channel portion and adapted to be endwisely inserted in the hanger socket with the top and bottom walls of the element arranged to lap the opposing faces of the head lugs, said top and bottom walls being provided with openings therethrough, the element being provided with a rib disposed lengthwise of the element and adapted to extend into said groove, the element also having a longitudinally disposed extension or lug adapted to engage the truss rod.

4. In combination with a brake beam, the truss rod and the brake head, with the head provided with a center hanger socket and vertically spaced lugs, the wall of the socket being provided with a groove disposed transversely of the head and tapering toward one end, a wear receiving element provided with an elongated channel open at the forward side and at the ends, said element having a substantially flat wall portion disposed forwardly of the open side of the channel and being adapted to be endwisely inserted in the hanger socket with said wall arranged to lap the face of one of said head lugs, the element being provided with a tapering rib disposed transversely of the element and adapted to extend into said groove and effect wedging relation between the element and the head, one end of the element being provided with a longitudinally disposed lug adapted to engage the truss rod to prevent longitudinal movement of the element in one direction.

5. A brake head wear receiving element formed to provide an elongated arcuate channel open at the forward side and at the ends to constitute a horizontally disposed brake hanger receiving channel, with the top and bottom walls on their outer faces being provided with ribs disposed lengthwise of the element, while the curved channel forming portion at one end is provided with an outwardly disposed lug adapted to cooperate with a portion of the brake rigging to prevent longitudinal movement of the element.

6. In combination with a brake head having a hanger receiving socket coincident with the shoe lug receiving space intermediate of the vertically spaced head lugs, the head being provided with a groove above and beneath said socket communicating with the socket and extending from side to side of the head, a wear receiving element formed to provide an elongated arcuate channel open at the ends and at the forward longitudinal side, said element being formed to provide a shoe locking key passage and on its top and bottom walls being provided with ribs extending from end to end, the element being endwisely insertible in said head socket with its ribs arranged in said head grooves whereby the element will be held in place against movement toward the forward side of the head, the end of the element coincident with the inner side of the head being provided with an outwardly disposed truss rod engaging lug.

7. A brake head wear receiving element composed of a single metal piece formed to provide a hanger receiving open ended socket open at the forward side, a wing portion disposed forwardly from the forward open side of the socket portion and formed to permit passage of a shoe locking key, said element having upwardly and downwardly disposed brake head engaging portions and a longitudinally disposed truss rod engaging portion.

8. A wear receiving element of the character described composed of a single metal piece formed to provide an open ended hanger receiving socket along one longitudinal side, open toward the front and to provide forwardly disposed wing portions adapted to lap brake head lugs and formed to permit passage of the shoe locking key; and brake head and truss rod engaging lugs arranged at one end of the element.

9. A brake head wear receiving element composed of a socket portion open at the ends and toward the forward side and a wing portion disposed forwardly from one longitudinal edge of the socket portion, said wing portion being formed to permit passage of a shoe locking key therethrough, the element being provided with a transversely disposed portion adapted to cooperate with the brake head and prevent forward movement of the element and having a protruding portion at one end of the element adapted to cooperate with the truss-rod of the brake head to prevent transverse movement of the element.

10. A brake head wear receiving element formed to provide a hanger receiving elongated channel open at the forward side and at the ends and adapted to be inserted in the hanger socket of a brake head, said element being formed to provide a shoe locking key passage, one end of the element being provided with an outwardly projecting truss rod engaging lug.

VICTOR H. HARBERT.